United States Patent

Oetzel

[15] 3,705,354

[45] Dec. 5, 1972

[54] GENERATION OF HIGH-POWER HIGH-FREQUENCY RADIO IMPULSES

[72] Inventor: George N. Oetzel, Palo Alto, Calif.

[73] Assignee: Standard Research Institute, Menlo Park, Calif.

[22] Filed: Oct. 2, 1970

[21] Appl. No.: 77,457

[52] U.S. Cl. ....................325/106

[51] Int. Cl. ....................H04b 1/04

[58] Field of Search .........325/101, 106, 107, 27, 129

[56] References Cited

UNITED STATES PATENTS

| | | | |
|---|---|---|---|
| 2,499,155 | 2/1950 | O'Neil | 325/129 |
| 1,939,053 | 12/1933 | Hunt | 325/129 |
| 1,304,868 | 5/1919 | Franklin | 325/106 |
| 2,450,413 | 10/1948 | Benioff | 325/106 |
| 2,403,726 | 7/1946 | Lindenblad | 325/129 |
| 2,934,640 | 4/1960 | Darling | 325/129 |

*Primary Examiner*—Robert L. Griffin
*Assistant Examiner*—Barry L. Leibowitz
*Attorney*—Urban H. Faubion and Lindenberg, Freilich and Wasserman

[57] ABSTRACT

High-power, high-frequency, radio impulses are derived from the energy stored in a low-impedance, resonant transmission line. The energy is discharged by a suitable switching device, generally a spark gap, and the resulting R.F. oscillations are coupled to an antenna.

3 Claims, 2 Drawing Figures

PATENTED DEC 5 1972 3,705,354

INVENTOR
GEORGE N. OETZEL
BY Lindenberg, Freilich & Wasserman
ATTORNEYS

GENERATION OF HIGH-POWER HIGH-FREQUENCY RADIO IMPULSES

BACKGROUND OF THE INVENTION

This invention relates to a method and means of generating high-power, short-duration, radio-frequency signals. Switching techniques are used to effect the short-pulse, high-power signal generation.

About the beginning of this century, spark-gap switches were used to discharge energy stored in a capacitor through an inductance to create oscillating currents and generate RF power. The technique was unsatisfactory because the rather low switching rate of spark switches produced an impulsive, broadband signal that was not effective for communications requirements.

With the advent of the vacuum tube, class C amplifiers that switch on each RF cycle became practical, and the resulting RF impulses could readily be filtered to obtain the pure CW and modulated RF communications signals that are in common use today. The use of spark switching for RF signal generation fell into disuse and was ignored for many years following this development.

The recent interest in high-resolution radars has revived a need for high-power, short-duration RF pulses. For this purpose, the switching characteristics of the spark gap, and possibly of other switching devices yet to be developed, offer a number of uniquely simple techniques for generating short pulses at power levels which can be obtained with vacuum tubes and other devices only with difficulty and at great expense, if at all. This invention is one such technique. It is simple and effective in the HF and VHF bands.

OBJECTS AND SUMMARY OF THE INVENTION

An object of this invention is the provision of a simple system for generating high pulse powers in the HF and VHF regions using spark-switching techniques.

Still another object of the present invention is the provision of an efficient spark-switching technique for generating large pulse powers in the HF and VHF regions.

Yet another object of the present invention is the provision of a novel spark-switching technique for generating large pulse powers in the HF and VHF regions.

These and other objects of the present invention are achieved by use of a fast switch, such as a spark gap, to discharge energy stored in a low impedance transmission line, so terminated at the ends that it acts as a one-half wavelength resonator. The antenna being driven is coupled to the transmission line. The use of the transmission line concept together with the half wavelength mode thereof, greatly reduces the inductance of the circuit and thereby increases the energy which can be stored for any given frequency of resonator. The reduced inductance is achieved because the transmission line geometry eliminates the current "loops" which generally are created in lumped circuit construction.

DESCRIPTION OF THE PREFERRED EMBODIMENTS

Figure 1:
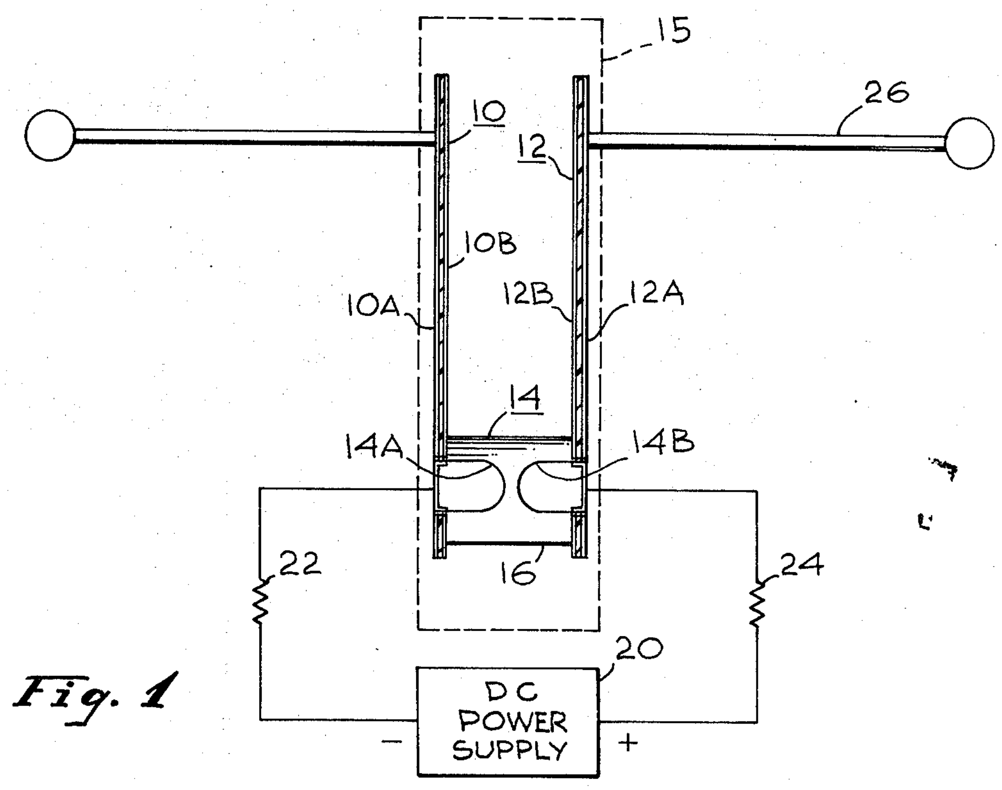
FIG. 1 is a schematic drawing of one embodiment of a transmitter in accordance with this invention.

Referring now to FIG. 1, there may be seen a schematic diagram of a simple transmission line transmitter, using spark switching, in accordance with this invention. In order to make up the half wavelength transmission line, two quarter wavelength line segments respectively 10, 12, were constructed from highly insulating printed circuit board which has on each side, a conductive coating one-quarter wavelength long in the dielectric medium of the circuit board. The spark-gap unit 14 is a unit of standard design. The spark-gap electrodes respectively 14A, 14B are connected to the respective outside conductive leads 10A, 12A of the printed circuit board through holes in the printed circuit board.

The spark-gap electrodes are surrounded by a cylindrical shield 16 which is connected to the inner conductors respectively 10B, 12B on the printed circuit board. This forms the spark-gap structure into a short section of coaxial line, which also has low inductance. The transmission line elements and spark gap may be enclosed in a housing 15, represented by the dotted lines.

The respective transmission line segments 10, 12, are charged from a balance DC power supply 20, through the respective resistors 22 and 24, respectively connected to the conductors 10A and 12A.

When the spark-gap 14 breaks down, RF current is generated. A dipole antenna 26 makes up the radiating element and is connected to the outer conductors 10A, 12A. Other antennas, such as the Yagi-Uda antenna may be used to obtain directive radiation and control of the pulse shape and spectrum of the radiated pulse.

Because the transmitter impedance is much less than the antenna impedance, the antenna has little effect on the transmitter frequency. The pulse shape and spectrum of the radiated pulse are controlled by the Q of the antenna and the ratio of the transmitter and antenna impedances. Use of the antenna design for filtering of the radiated pulses is an important practical aspect of the use of these transmitter units. However, for simplicity, dipole antennas are shown in the figures.

The design procedure is based on a few simple equations. If there were no added inductance contributed by the spark-gap and the structure necessarily associated with it, then each transmission line segment would be exactly one-quarter wavelength line. Since the two transmission line segments are charged in series by the total voltage of the balanced power supply, the equivalent energy storing capacitor has the same capacity as the length of transmission line equal to $\lambda/8$, in the dielectric medium involved. This capacity is a function of the RF frequency and transmission line impedance and it does not depend directly on dielectric constants of materials or transmission line geometry. Both the dielectric properties of materials and the geometry may have a significant effect on the realization of a given impedance line in practice, however.

From standard transmission line theory the impedance of the line is $$Z_o = (L/C)^{1/2}$$

where $L$ and $C$ are the inductance and capacitance per unit length of the line. The wave velocity along the line is $$v = (LC)^{-1/2}, \text{ and the wavelength is}$$

$$\lambda = v/f$$

where $f$ is the frequency of operation. Then from these formulas we find that the capacitance in a $\lambda/8$ length of line is $$C\lambda/8 = (8Z_o f)^{-1}$$

This formula gives the maximum energy storing capacitance that can be attained in a transmitter of this design, as a function of frequency and $Z_o$ of the transmission line.

From the above formula it appears that the energy stored, and hence the radiated pulse energy can be increased indefinitely by lowering the $Z_o$ of the line. There are practical limitations, however. One limitation is that of materials and geometry. A transmission line with an impedance less than one ohm either becomes very large, or materials of high dielectric constant and high dielectric strength must be used to build it. Since the spark is very small, the gap and the current return structure around it inevitably represent an inductive discontinuity in the transmission line structure. In addition, at very low impedances, the resistance of the spark will result in important energy losses in the spark. Transmitter units with a characteristic impedance of a few ohms have been operated satisfactorily.

Figure 2:
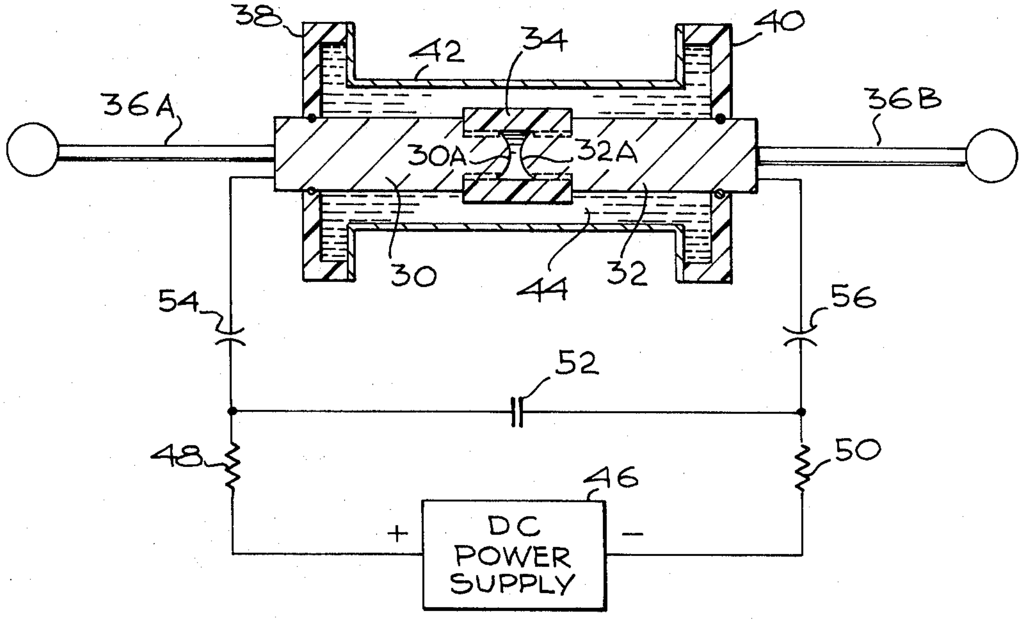
FIG. 2 is a schematic drawing of a transmitter comprising another embodiment of the invention.

Referring now to FIG. 2, there may be seen a schematic in cross-sectional view of another embodiment of this invention. This comprises a coaxial type transmission line which uses water as a dielectric material. The advantages of water for this particular design are that it has a very high dielectric constant, high breakdown strength, and in the event of an arc, it is self-healing.

The coaxial transmitter comprises two inner cylindrical conductors respectively 30, 32, having their ends threaded into a circular plastic sleeve 34. The ends respectively 30A, 32A, of these circular conductors are shaped as spark-gap electrodes. These ends are threaded into the plastic sleeve only sufficiently far to leave a spark-gap therebetween.

Both arms respectively 36A, 36B, of the radiating dipole are attached to the ends of the respective elements 30, 32. As discussed in connection with FIG. 1, other antennas can also be used.

Mounted on the outer ends of the elements are circular plastic end plates respectively 38, 40. The outer ends of the plastic end plates have an inward flange to which is attached the outer cylindrical conductor 42 of the coaxial transmission line. This cylindrical conductor has end flanges which extend to and are sealed to the plastic end plates. The dielectric comprising water 44, fills the space between the inner and outer conductors of the transmission line.

At low frequencies and DC, leakage currents occur in the water dielectric to an extent that they can interfere with the operation. Accordingly, the transmitter must be charged impulsively. The DC power supply 46, accomplishes this by charging, through respective resistors 48, 50 and an energy storage capacitor 52. The charge from the energy storage capacitor is applied to two spark gaps 54, 56, designated as charging gaps. This arrangement charges the transmission line in the time of a few microseconds. It should be appreciated that the two lengths of these central coaxial conductors 30, 32 are respectively slightly less than one-quarter wavelength each at the desired frequency.

In an embodiment of the invention which was built, using a power supply voltage of 100 kilovolts, a peak pulse power of 15 megawatts has been measured at a frequency of 44 MHz. By way of example, and not to serve as a restriction upon the invention, the outer electrode was made from 6 inches O.D. aluminum tubing. The plastic end plates had 14 inches diameter flanges. This distance was primarily intended to assure a long electrical breakdown path in air around the ends of the device. The distance between the flanges, for a 23.5 MHz unit was 19.4 inches.

From the foregoing description it will be seen that a simple high-powered and novel transmission line spark transmitter has been described.

What is claimed is:

1. A transmitter comprising first and second transmission line sections which are axially aligned with one another and which have inner ends spaced from one another, said first and second transmission electrodes, each being substantially one-quarter wavelength long at a desired frequency, first and second spark gap electrodes, respectively coupled to the spaced inner ends of said first and second transmission line sections, a cylindrical outer conductor substantially coextensive and concentric with said two transmission line sections, means for coupling an antenna to the ends of said transmission line sections to which said spark gap electrodes are not connected, cap means closing the end spaces between the ends of said outer cylindrical conductors and said transmission line sections, water filling the space between said outer cylindrical conductors and said transmission line sections, and means for applying discharging potential to said spark gap electrodes.

2. A transmission line spark transmitter comprising a first and second central conductor each substantially one-quarter wavelength long at the frequency desired for radiation, each having one end terminating in the shape of a spark-gap electrode, means for holding said central conductors axially aligned with said spark-gap electrode ends spaced opposite from one another to form a spark gap, an outer cylindrical conductor positioned substantially coaxial with said inner central conductors and being substantially coextensive with them, end cap means closing off the space between the ends of said outer cylindrical conductor and said inner central conductors, a dielectric liquid material filling the space between said inner and outer conductors, means for connecting the other ends of said inner conductors to a radiating element, and means for applying a potential to said inner conductor until a discharge occurs between the two spark-gap electrode ends.

3. Apparatus as recited in claim 2 wherein said means for applying a potential to said inner conductors until a discharge occurs between the spark-gap electrode ends comprises a first and second spark-gap means having one end respectively connected to the respective ends of the first and second inner conductors, energy storage capacitor means connected to the other ends of the spark-gap means for applying discharging potential, and means for applying a DC potential to said energy storage capacitor means.

* * * * *